United States Patent
Bird et al.

(10) Patent No.: US 12,524,647 B2
(45) Date of Patent: *Jan. 13, 2026

(54) AUTOMATED MERGE CONFLICT RESOLUTION

(71) Applicant: MICROSOFT TECHNOLOGY LICENSING, LLC., Redmond, WA (US)

(72) Inventors: Christian Bird, Redmond, WA (US); Elizabeth Dinella, Philadelphia, PA (US); Shuvendu K. Lahiri, Sammamish, WA (US); Todd Douglas Mytkowicz, Redmond, WA (US); Neelakantan Sundaresan, Bellevue, WA (US); Alexey Svyatkovskiy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1196 days.

This patent is subject to a terminal disclaimer.

(21) Appl. No.: 17/175,521

(22) Filed: Feb. 12, 2021

(65) Prior Publication Data

US 2022/0164672 A1    May 26, 2022

Related U.S. Application Data

(60) Provisional application No. 63/116,595, filed on Nov. 20, 2020.

(51) Int. Cl.
*G06N 3/02*     (2006.01)
*G06F 8/30*     (2018.01)
(Continued)

(52) U.S. Cl.
CPC ............... *G06N 3/02* (2013.01); *G06F 8/311* (2013.01); *G06N 3/044* (2023.01); *G06N 3/045* (2023.01);
(Continued)

(58) Field of Classification Search
CPC ....................................................... G06F 8/71
See application file for complete search history.

(56) References Cited

U.S. PATENT DOCUMENTS 7,013,304 B1 * 3/2006 Schuetze ............. G06F 16/9027
                                                          707/E17.112
9,128,804 B2 * 9/2015 Gores ....................... G06F 8/71
(Continued)

OTHER PUBLICATIONS

Feng, et al., "CodeBERT: A Pre-Trained Model for Programming and Natural Languages", In Repository of arXiv:2002.08155v3, Apr. 27, 2020, 10 Pages.
(Continued)

*Primary Examiner* — Lewis A Bullock, Jr.
*Assistant Examiner* — Theodore E Hebert
(74) *Attorney, Agent, or Firm* — Workman Nydegger

(57) ABSTRACT

An automated system for resolving program merges uses a sequence-to-sequence supervised machine learning model trained from developer-resolved merge conflicts to learn to predict a merge resolution to resolve a three-way program merge. The model utilizes an embedding of the merge tuple (A, B, O) which represents the program syntax, program semantics and the intent of the program inputs. The model uses a pointer mechanism to construct the resolved program in terms of the lines of source code found in the input programs.

20 Claims, 8 Drawing Sheets

(51) Int. Cl.
| | |
|---|---|
| *G06F 8/71* | (2018.01) |
| *G06N 3/044* | (2023.01) |
| *G06N 3/045* | (2023.01) |
| *G06N 3/088* | (2023.01) |
| *G06N 7/01* | (2023.01) |

(52) U.S. Cl.
CPC ............... *G06N 3/088* (2013.01); *G06N 7/01* (2023.01); *G06F 8/71* (2013.01)

(56) References Cited

U.S. PATENT DOCUMENTS

| | | | | |
|---|---|---|---|---|
| 9,141,682 | B1* | 9/2015 | Adoc, Jr. | G06F 9/52 |
| 9,430,229 | B1* | 8/2016 | Van Zijst | G06F 9/3844 |
| 9,471,304 | B1* | 10/2016 | Fuchs | G06F 8/71 |
| 9,575,764 | B1 | 2/2017 | Turner et al. | |
| 9,734,447 | B1 | 8/2017 | Diev | |
| 10,600,005 | B2 | 3/2020 | Gunes | |
| 11,030,747 | B1 | 6/2021 | Feng | |
| 11,055,639 | B1 | 7/2021 | Cay | |
| 11,119,759 | B2 | 9/2021 | Samudrala | |
| 11,238,332 | B2* | 2/2022 | Ainslie | G06N 3/084 |
| 11,397,750 | B1 | 7/2022 | Lekakis | |
| 11,507,655 | B1 | 11/2022 | Ketireddy | |
| 11,714,617 | B1* | 8/2023 | Sundaresan | G06N 3/0455 717/110 |
| 11,853,746 | B2* | 12/2023 | Groenewegen | G06F 8/70 |
| 11,868,421 | B1 | 1/2024 | Giles | |
| 2015/0220331 | A1* | 8/2015 | Bernstein | G06F 8/71 717/121 |
| 2015/0268948 | A1* | 9/2015 | Plate | G06F 21/577 717/123 |
| 2015/0269494 | A1* | 9/2015 | Kardes | G06F 16/355 706/12 |
| 2016/0267125 | A1* | 9/2016 | Tsofi | G06F 16/2365 |
| 2017/0091651 | A1* | 3/2017 | Miao | G06F 8/65 |
| 2017/0212829 | A1* | 7/2017 | Bales | G06F 11/3604 |
| 2020/0249918 | A1* | 8/2020 | Svyatkovskiy | G06N 3/084 |
| 2021/0056007 | A1* | 2/2021 | Viswanathan | G06F 11/3688 |
| 2021/0191715 | A1* | 6/2021 | Samudrala | G06N 20/00 |
| 2022/0027563 | A1* | 1/2022 | Zhicharevich | G06N 3/045 |
| 2022/0164626 | A1* | 5/2022 | Bird | G06F 8/311 |
| 2022/0398462 | A1* | 12/2022 | Clement | G06N 3/088 |
| 2025/0036911 | A1 | 1/2025 | Bird | |

OTHER PUBLICATIONS

"International Search Report and Written Opinion Issued in PCT Application No. PCT/US21/052494", Mailed Date: Jan. 21, 2022, 13 Pages.

Svyatkovskiy, et al., "MergeBERT: Program Merge Conflict Resolution via Neural Transformers", In Repository of arXiv:2109.00084v2, Sep. 8, 2021, 16 Pages.

"International Search Report and Written Opinion Issued in PCT Application No. PCT/US21/056782", Mailed Date: Feb. 14, 2022, 13 Pages.

Zao, et al., "Neural Networks for Modeling Source Code Edits", In Repository of arXiv:1904.02818v1, Apr. 4, 2019, 18 Pages.

Dinella, et al., "DeepMerge: Learning to Merge Programs", In Repository of arXiv:2105.07569v3, Sep. 6, 2021, 12 Pages.

Guimaraes, et al., "Improving early detection of software merge conflicts." Department of Computer Science and Engineering INESC-ID, IST, Jan. 30, 2024, 11 pages.

Non-Final Office Action mailed on Feb. 7, 2024, in U.S. Appl. No. 17/175,528, 22 pages.

Svyatkovskiy, et al, "MergeBERT: Program Merge Conflict Resolution via Neural Transformers" Sep. 8, 2021, 16 pages.

Zhu, et al., "Conflict Resolution for Structured Merge via Version SpaceAlgebra", In Proceedings of the Proceedings of the ACM on Programming Languages, Nov. 2018, 25 Pages.

Alon, et al., "code2seq: Generating Sequences from Structured Representations of Code", In Proceedings of the International Conference on Learning Representations, May 6, 2019, pp. 1-22.

Apel, et al., "Semistructured Merge in Revision Control Systems", In Proceedings of the Fourth International Workshop on Variability Modelling of Software-intensive Systems, Jan. 27, 2010, 7 Pages.

Apel, et al., "Structured merge with auto-tuning: balancing precision and performance", In Proceedings of the 27th IEEE/ACM International Conference on Automated Software Engineering, Sep. 3, 2012, pp. 120-129.

Brindescu, et al., "Lifting the Curtain on Merge Conflict Resolution: A Sensemaking Perspective", In Proceedings of the IEEE International Conference on Software Maintenance and Evolution, Sep. 28, 2020, pp. 534-545.

Brindescu, et al., "Planning for Untangling: Predicting the Difficulty of Merge Conflicts", In Proceedings of the IEEE/ACM 42nd International Conference on Software Engineering, May 2020, 11 Pages.

Brun, et al., "Proactive Detection of Collaboration Conflicts", In Proceedings of the 19th ACM SIGSOFT Symposium and the 13th European Conference on Foundations of Software Engineering, Sep. 5, 2011, pp. 168-178.

Cho, et al., "Learning Phrase Representations using RNN Encoder-Decoder for Statistical Machine Translation", In Journal of Computing Research Repository, Jun. 3, 2014, 14 Pages.

Cho, et al., "Learning Phrase Representations using RNN Encoder—Decoder for Statistical Machine Translation", In Proceedings of the Conference on Empirical Methods in Natural Language Processing, Oct. 25, 2014, pp. 1724-1734.

Clement, et al., "PyMT5: Multi-mode Translation of Natural Language and Python Code with Transformers", In Proceedings of the Conference on Empirical Methods in Natural Language Processing, Nov. 16, 2020, pp. 9052-9065.

Zhou, et al., "Sequential Copying Networks", In Proceedings of the Thirty-Second AAAI Conference on Artificial Intelligence, Feb. 2, 2018, 8 Pages.

Dinella, et al., "Hoppity: Learning Graph Transformations to Detect and Fix Bugs in Programs", In Proceedings of the International Conference on Learning Representations, Apr. 26, 2020, pp. 1-17.

Ferreira, et al., "Software Engineering Meets Deep Learning: A Literature Review", In Repository of arXiv:1909.11436v1, Sep. 25, 2019, pp. 1-18.

Fraternali, et al., "Almost Rerere: an approach for automating conflict resolution from similar resolved conflicts", In Proceedings of the International Conference on Web Engineering, Jun. 9, 2020, pp. 1-16.

Ghiotto, et al., "On the Nature of Merge Conflicts: A Study of 2,731 Open Source Java Projects Hosted by GitHub", In Journal of IEEE Transactions on Software Engineering. vol. 46, Issue 8, Aug. 1, 2020, pp. 892-915.

Godefroid, et al., "Learn&fuzz: Machine learning for input fuzzing", In Proceedings of the 32nd IEEE/ACM International Conference on Automated Software Engineering, Oct. 30, 2017, pp. 50-59.

Gu, et al., "Deep Code Search", In Proceedings of the IEEE/ACM 40th International Conference on Software Engineering, May 27, 2018, pp. 933-944.

Gu, et al., "Incorporating Copying Mechanism in Sequence-to-Sequence Learning", In Proceedings of the 54th Annual Meeting of the Association for Computational Linguistics, vol. 1, Aug. 7, 2016, pp. 1631-1640.

Jensen, et al., "Type analysis for JavaScript", In Proceedings of the 16th International Static Analysis Symposium, Aug. 9, 2009, pp. 1-18.

Kalliamvakou, et al., "The promises and perils of mining github", In Proceedings of the 11th Working Conference on Mining Software Repositories, May 31, 2014, pp. 92-101.

Karampatsis, et al., "Big Code != Big Vocabulary: Open-Vocabulary Models for Source Code", In Proceedings of the 42nd International Conference on Software Engineering, May 23, 2020, pp. 1073-1085.

(56) References Cited

OTHER PUBLICATIONS

Kashyap, et al., "JSAI: a static analysis platform for JavaScript", In Proceedings of the 22nd ACMSIGSOFT International Symposium on Foundations of Software Engineering, Nov. 16, 2014, pp. 121-132.

Khanna, et al., "A formal investigation of diff3", In International Conference on Foundations of Software Technology and Theoretical Computer Science, Dec. 2007, pp. 485-496.

Li, et al., "Deep learning in software engineering", In Repository of arXiv:1805.04825, May 2018, pp. 1-10.

Mens, Tom, "A state-of-the-art survey on software merging", In Proceedings of the IEEE transactions on software engineering vol. 28, Issue 5, May 2002, pp. 449-462,.

Yin, et al., "Learning to Represent Edits", In International Conference on Learning Representations, May 6, 2019, pp. 1-22.

Panthaplackel, et al., "Copy That! Editing Sequences by Copying Spans", In Proceedings of the Eighth International Conference on Learning Representations, Apr. 26, 2020, pp. 1-15.

Papineni, et al., "BLEU: A Method for Automatic Evaluation of Machine Translation", In Proceedings of the 40th Annual Meeting on Association for Computational Linguistics, Jul. 6, 2002, pp. 311-318.

Ramesh, Shashank, "Semantic Code Search Using Transformers and BERT—Part I; Overview and Data Preprocessing", Retrieved from: https://medium.com/swlh/semantic-code-search-using-transformers-and-bert-part-i-overview-and-data-preprocessing-fee34be134e1, Jul. 10, 2020, 14 Pages.

Rijsbergen, C. J. Van, "Information Retrieval", In Publication of Butterworth-Heinemann, Jan. 1979, 153 Pages.

Sousa, et al., "Verified Three-way Program Merge", In Proceedings of the ACM on Programming Languages, vol. 2. Nov. 2018, 29 Pages.

Sutskever, et al., "Sequence to Sequence Learning with Neural Networks", In Proceedings of the 27th International Conference on Neural Information Processing Systems, Dec. 8, 2014, 9 Pages.

Svyatkovskiy, et al., "Pythia: AI-assisted Code Completion System", In Proceedings of the 25th ACM SIGKDD International Conference on Knowledge Discovery & Data Mining, Aug. 4, 2019, pp. 2727-2735.

Tufano, et al., "An Empirical Study on Learning Bug-Fixing Patches in the Wild via Neural Machine Translation", In Proceedings of the ACM Transactions on Software Engineering and Methodology, Sep. 2019, 29 Pages.

Vinyals, et al., "Pointer Networks", In Proceedings of the Annual Conference on Neural Information Processing Systems, Dec. 7, 2015, pp. 1-9.

Waddicor, Alice, "Using SemanticMerge to fix Git merge conflicts", Retrieved from: https://endjin.com/blog/2014/08/using-semanticmerge-to-fix-git-merge-conflicts, Aug. 20, 2014, 16 Pages.

Wang, et al., "Automatically Learning Semantic Features for Defect Prediction", In Proceedings of the 38th International Conference on Software Engineering, May 14, 2016, pp. 297-308.

Westfechtel, et al., "Structure-oriented merging of revisions of software documents", In Proceedings of the 3rd International Workshop on Software Configuration Management, May 1991, pp. 68-79.

Yang, et al., "A Program Integration Algorithm That Accommodates Semantics-preserving Transformations", In Journal of ACM Transactions on Software Engineering and Methodology, Jul. 1992, pp. 310-354.

Jiang, et al., "Combining Generative and Discriminative Approaches to Unsupervised Dependency Parsing via Dual Decomposition", In Proceedings of the Conference on Empirical Methods in Natural Language Processing, Sep. 7, 2017, pp. 1689-1694.

Rajapakse, Thilina, "BART for Paraphrasing with Simple Transformers", Retrieved from: https://towardsdatascience.com/bart-for-paraphrasing-with-simple-transformers-7c9ea3dfdd8c, Aug. 5, 2020, 20 Pages.

Owhadi-Kareshk, et al., "Predicting Merge Conflicts in Collaborative Software Development", In Journal of the Computing Research Repository, Jul. 14, 2019, 11 Pages.

Pordel, Mostafa, "A Metamodel independent approach for Conflict Detection to support distributed development in MDE", A Thesis Submitted in Partial Fulfillment of Requirements for the Master Degree of Software Engineering, School of Innovation, Design and Engineering, Mälardalen University, Sep. 10, 2009, 50 Pages.

"MergeResolver—Automatic Merge Conflict Resolution", Retrieved from: http://web.archive.org/web/20200622131625/https:/blogs.grammatech.com/mergeresolver-automatic-merge-conflict-resolution, Jun. 22, 2020, 10 Pages.

Nguyen, et al., "Discriminative Features Fusion with BERT for Social Sentiment Analysis", In Proceedings of the International Conference on Industrial, Engineering and Other Applications of Applied Intelligent Systems, Sep. 22, 2020, pp. 30-35.

Communication under Rule 71(3) Received for European Application No. 21811600.2, mailed on Jun. 3, 2024, 8 pages.

Communication under Rule 71(3) received in European Application No. 21805693.5, mailed on May 31, 2024, 8 pages.

Decision to grant Received for European Application No. 21805693.5, mailed on Oct. 4, 2024, 2 pages.

Feng, et al., "Evolving transformer architecture for neural machine translation", GECCO '21: Proceedings of the Genetic and Evolutionary Computation Conference Companion, Jul. 8, 2021, pp. 273-274.

Huang, et al., "Accelerating Transformer for Neural Machine Translation", ICMLC '21: Proceedings of the 2021 13th International Conference on Machine Learning and Computing, Jun. 21, 2021, pp. 191-197.

Notice of Allowance mailed on Jul. 10, 2024, in U.S. Appl. No. 17/175,528, 14 pages.

Wu, et al., "Genetic Algorithm-based Transformer Architecture Design for Neural Machine Translation", MLMI '22: Proceedings of the 2022 5th International Conference on Machine Learning and Machine Intelligence, Mar. 6, 2023, pp. 98-104.

Zhang, et al., "Using pre-trained language models to resolve textual and semantic merge conflicts (experience paper)", ISSTA—Proceedings of the 31st ACM SIGSOFT International Symposium on Software Testing and Analysis, Jul. 18, 2022, pp. 77-88.

Decision to grant a European patent pursuant to Article 97(1) Received for European Application No. 21811600.2, mailed on Sep. 26, 2024, 02 pages.

Notice of Allowance mailed on Aug. 29, 2024, in U.S. Appl. No. 17/175,528, 05 pages.

* cited by examiner

AUTOMATED MERGE CONFLICT RESOLUTION

CROSS-REFERENCE TO RELATED APPLICATIONS

The present application claims the benefit of the earlier filed provisional application having Ser. No. 63/116,595 filed on Nov. 20, 2020, which is incorporated by reference in its entirety.

BACKGROUND

During a software development project, a team of developers may collaborate on the source code, documentation, test scripts and other files and collections of data which are stored in a repository accessible to the developers of the team. To manage the changes made to a file during development, the files may be stored in a repository managed by a version control system. The version control system maintains the versions of the files of a repository and the history of changes made to the files over time.

In a distributed version control system, the repository is distributed to each collaborator including the complete revision history and a working copy of the code base. A branch is a duplication of a file subject to the version control system for an independent line of development so that changes can be made to the duplicate file independent of the original file. A merge command is used to integrate changes across the two branches in a version control system. A merge can be performed automatically if there is no conflict. A merge conflict arises when two programs make changes to the same source code segment. The merge conflict needs to be resolved before the revisions are merged back to the repository and in a manner that does not introduce subtle bugs or unwanted program behavior. The merge command does not provide suggestions on how to perform a merge rather indicates the existence of a merge conflict when a conflict is detected. Often the user has to resolve the conflict by combining the changes or selecting only one of the changes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An automated system for resolving program merges uses a sequence-to-sequence machine learning model trained from developer-resolved merge conflicts to learn to predict a merge resolution to resolve a three-way program merge. The model utilizes an embedding of a merge tuple (A, B, O) in a single sequence, where A and B are programs modified from a common code base O. The single sequence or edit-aware input sequence represents an embedding of the merge tuple (A, B, O) formed from four token sequences (A', AO', B', BO') representing a pair-wise alignment of the tokens of a program with the common code base O and two edit sequences ($\Delta$AO, $\Delta$BO) representing similarities and differences between each program's aligned token sequence with the aligned token sequence of the common code base.

The model constructs the resolved program as an interleaving of the lines of source code from the input programs A, B, O. In one aspect, the model is configured as a Recurrent Neural Network (RNN) encoder-decoder, with a bidirectional encoder coupled to an attention layer and a decoder that uses a pointer mechanism 313.

The model is trained from a training dataset of manually-created merge conflict resolutions extracted from various source code repositories. The training dataset is extracted from change histories of software repositories and is considered supervised since the exact merge resolution committed by the developer performing the merge is extracted. The merge tuples used in the training dataset include merge resolutions that utilize lines of source code from programs A, B, and/or O. In addition, merge resolutions that do not utilize lines of source code from the input programs but only differ by the addition of a single new token are included in the training dataset as examples of a merge conflict.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1A:
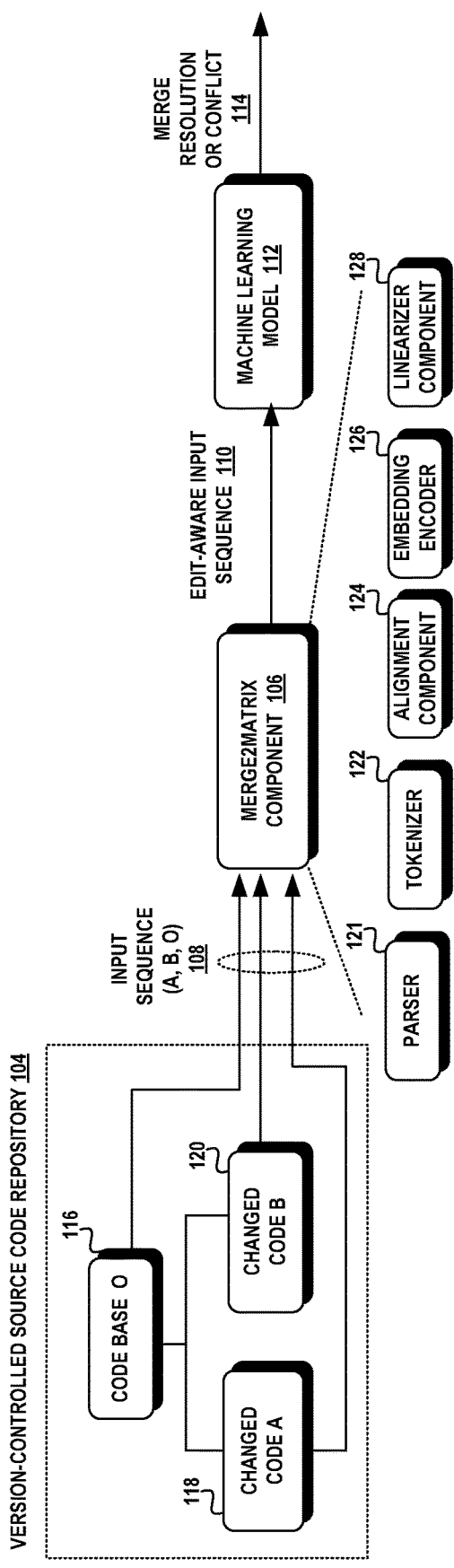
FIG. 1A illustrates an exemplary merge resolution system that uses a machine learning model to translate an edit-aware input sequence representing a three-way merge into a merge resolution.

The subject matter disclosed pertains to an automated system for resolving program merges using machine learning. A machine learning model is trained from developer-resolved merge conflicts to learn to predict a merge resolution to resolve a three-way program merge.

A three-way program merge takes as input two programs, A and B, obtained by modifying a common base program O and either provides a merged program or resolution R that preserves the intent of the changes made in A and B over O or declares a conflict between the two changes that cannot be resolved automatically. The techniques described herein formulate the problem of program merging as a sequence-to-sequence supervised learning task that trains a machine learning model to learn the syntactic changes and semantic intents of the program changes made to a code base in order to either predict an output sequence R representing a merge resolution or indicate a merge conflict. Machine learning offers an approach to merge resolution that incorporates the syntactic changes and semantic intents of the program changes from developer-resolved merge conflicts.

Source code repositories may offer three-way merge tools that automatically merge changes made to different branches of a repository. These tools utilize semantic-based techniques or text-based techniques both of which are prone to introducing unwanted behaviors and errors. A text-based merge technique treats programs as list-structured textual data. One example of a text-based merge program is the Unix utility diff3. This technique aligns the two-way diffs of program A over the common code base program O into a sequence of diff slots and incorporates the textual change from one of A or B at each slot unless both programs change a common slot. If both programs change a common slot, a textual merge conflict is produced that requires manual resolution of the conflicting textual changes.

Semantic-based merge techniques are based on an analysis of the behavior of the program execution of the proposed changes. A semantic-based merge technique relies on program analysis techniques that analyze output values altered by the changes. The two programs A and B make conflicting changes if and only if they both alter the behavior of an output variable in a common execution path. However, this technique has limited scalability and application. For example, dynamic programming features, such as reflection in some object-oriented programming languages (C#, Java) and eval in Python and JavaScript cannot be determined statically and are performed at runtime.

The machine learning merge technique overcomes these limitations by using a data-driven approach that learns to predict a merge resolution from real-world merges and merge-conflict data. This data-driven approach considers the semantics of the proposed merger, the syntax of the programming language, and the textual differences between the changes.

However, the use of a machine learning model presents several challenges to effectively learn a merge algorithm for a given programming language. There needs to be a representation of the merge inputs that identifies the edits from both programs relative to the common base. In addition, this representation needs to be a single sequence since a sequence-to-sequence translation task requires a single input sequence and a single output sequence. In the case of a three-way merge, there are at least three input sequences of varying length corresponding to the three versions of the program involved in a merger.

The technique disclosed herein constructs an edit-aware input sequence that is an aligned and linearized representation of a three-way merge as a single variable-length input sequence (e.g., matrix). This input sequence represents the proposed edits to the code base which are composed from token-aligned sequences representing the source code changes relative to the code base and edit sequences representing the textual differences.

The output vocabulary needs to be constrained in order to control the size of the model. A large output vocabulary increases the memory usage requirements for the model and negatively impacts its performance. To address this challenge, a merge resolution or output sequence is an interleaving of the lines of input programs. This drastically cuts down the output vocabulary since the model generates a sequence of integers within a small bound to denote the position of a token (e.g., char, word, line) in the input sequence. As such, the model is a variant of a pointer network sequence-to-sequence model, where the output sequence is a sequence of positions of lines from the input sequence.

Lastly, the training dataset needs to be composed of high-quality merge resolutions. A merge resolution is the source code solution that integrates the changes from program A and/or program B into code base O without a conflict. This task is challenging since automated merge resolutions may silently introduce errors. Developer-generated merge resolutions may introduce extraneous code changes or new code not present in code segments A, B or code base O. In order to obtain high-quality merge resolutions for the training dataset, the system extracts a merge resolution that is derived from lines in code segments A, B or O. In addition, the system also uses merge resolutions having a single new token that was not present in code segments A, B, or O.

Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping. Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks.

In one aspect, the techniques described herein utilize a deep learning-based model, such as a RNN encoder-decoder model. This type of deep learning model learns to predict a merge resolution from a supervised training dataset of developer-generated merges having variable-length inputs.

Attention now turns to a further description of the systems, devices, methods for automated merge conflict resolution.

System

Figure 1B:
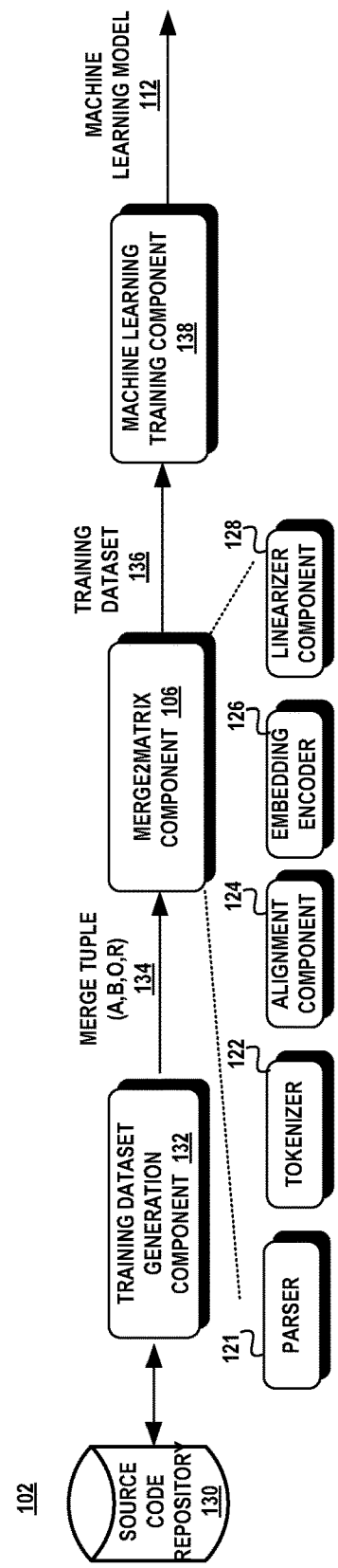
FIG. 1B illustrates an exemplary system for training an exemplary machine learning model for merge resolution.

FIG. 1A illustrates the components of an exemplary system 100 for performing a three-way program merge and an exemplary process flow. FIG. 1B illustrates the components of an exemplary system 102 for training a machine learning model to learn to predict a merge resolution and an exemplary process flow.

Turning to FIG. 1A, in one aspect, the system 100 interacts with a version-controlled source code repository 104 to implement a program merge of changed code A 118 and changed code 120 into code base O 116. The system 100 includes a Merge2Matrix component 106 that obtains an input sequence 108 representing a merge tuple (A, B, O) from the source code repository which is transformed into an edit-aware input sequence 110 that is input to a machine learning model 112. The machine learning model 112 generates an output sequence 114 representing the merge resolution or an indication that the merge cannot be resolved.

A source code repository 104 is a file archive that hosts projects having source code files and other data (e.g., scripts, test cases, etc.) shared by multiple developers. The source code repository 104 may be private and internal to an organization, group, enterprise or user or may be publicly-accessible through the Internet. The source code repository

104 may contain source code files from different domains, such as without limitation, scientific computing, web development, dataflow programming, machine learning, and the like.

The source code repository 104 may include a version control system that manages changes made to the source code files, such as Git and Mercurial. In one aspect, the source code repository 104 is distributed where each developer has their own local repository of the source code with the history and versions of the source code.

Although the disclosure uses references from Git to describe the techniques described herein, it should not be construed as limiting the disclosed techniques to this particular source code repository and/or version control system.

A developer may use a copy of a source code file to develop features isolated from other copies of the source code file by placing the copy in a branch. Branches are used to distinguish a version of a source code file from its parent. A commit command records the changes made to a local repository. A merge command merges changes made in a source code file of a branch back to the parent source code file in the parent of master branch.

In a three-way merge, there are two branches off a parent branch. One branch contains source code program A 118 having changes to code base O 116, a second branch contains source code program B 120 having changes to code O 116, and the parent branch includes the code base O 116. A merge tuple (A, B, O) 108 is extracted from the source code repository for the automated merge integration process.

The Merge2Matrix component 106 includes a parser 121, a tokenizer 122, an alignment component 124, an embedding encoder 126 and a linearizer component 128. The Merge2Matrix component 106 receives three input sequences 108: input sequence A of changed code A 118, input sequence B of changed code B 120, and input sequence O of code base O 116. The Merge2Matrix component 106 transforms the three input sequences into a single matrix, edit-aware input sequence 110, that is input to the machine learning model 112.

The parser 121 parses each input sequence into a syntax tree. The tokenizer 122 extracts a sequence of tokens from a respective syntax tree. In one aspect, a byte-level byte pair encoder is used as the tokenizer 122. Byte pair encoding is a data compression technique in which most frequently co-occurring pairs of Unicode characters throughout a training dataset are substituted with an out-of-vocabulary character. When applied recursively, the byte pair encoding results in an extraction of tokens in sequences of frequently co-occurring Unicode characters. In one aspect, byte pair encoding is used to extract ordered sequences of Unicode characters to form tokens from a syntactic representation of the changed code A, changed code B and the code base O. A respective input sequence represents a source code fragment having a variable-length number of tokens.

The alignment component 124 aligns the tokens of a changed code sequence with the code base sequence using a standard diffing algorithm so that similar tokens are at the same positions. The alignment component 124 compares the aligned token sequences to find the edits needed to transform one sequence into a second sequence. The diff algorithm generates an aligned token sequence for each changed code sequence and the code base sequence. An edit sequence is generated for each aligned token sequence and aligned code base sequence pair and includes the edit operations needed to turn the code base sequence into the changed code sequence. An edit sequence captures information about the types of edits that need to be made and ignores the tokens that make up the edit other than the newline token "\n". The newline token "\n" identifies the physical lines of a program that are included in the edit sequence. The "\n" token is treated as a special symbol differently from other tokens since the diff algorithm is line-level.

Each edit sequence is transformed into a respective embedding by an embedding encoder 126. In one aspect, the embedding encoder 126 is a one-hot encoder. A one-hot encoder is used for categorical data where the input and output variables have a finite set of possible values, such as the types of edits (e.g., insert, delete, swap, or unchanged).

The embeddings are concatenated together and linearized by the linearizer component 128 to form an edit-aware input sequence or matrix 110 that represents the merge tuple (A, B, O) and the edits contained therein. The edit-aware input sequence 110 is input to a machine learning model 112 that predicts an output sequence 114 representing the program resolving the merged sequences or an indication of an unresolved merge conflict. In one aspect, the output sequence 114 represents indices to positions of the lines in the input sequence that are part of the merged resolution.

Turning to FIG. 1B, there is shown a system 102 having components used to train a machine learning model to learn to predict a merge resolution and an exemplary process flow. A training dataset generation component 132 extracts merge conflict scenarios unambiguously from programs stored in multiple source code repositories 130 to train a machine learning model. A merge conflict scenario is unambiguous when the exact code region that was generated by a developer is identified. An unambiguous merge scenario is represented as the merge tuple (A, B, O, R), where program O represents the code base, program A represents code changes from code base O, program B represents code changes from code base O, and R represents an instance of a merged resolution in region R.

The Merge2Matrix component 106 transforms each merge tuple 134 into an edit-aware input sequence using the parser 121, tokenizer 122, alignment component 124, embedding encoder 126 and linearizer component 128 as described above with respect to FIG. 1A. The Merge2Matrix component 106 forms a training dataset 136 that includes the edit-aware input sequences generated from the merge tuples. The training dataset 136 is then used by a machine learning training component 138 to train a machine learning model 112, such as an RNN encoder-decoder model.

Figure 2:
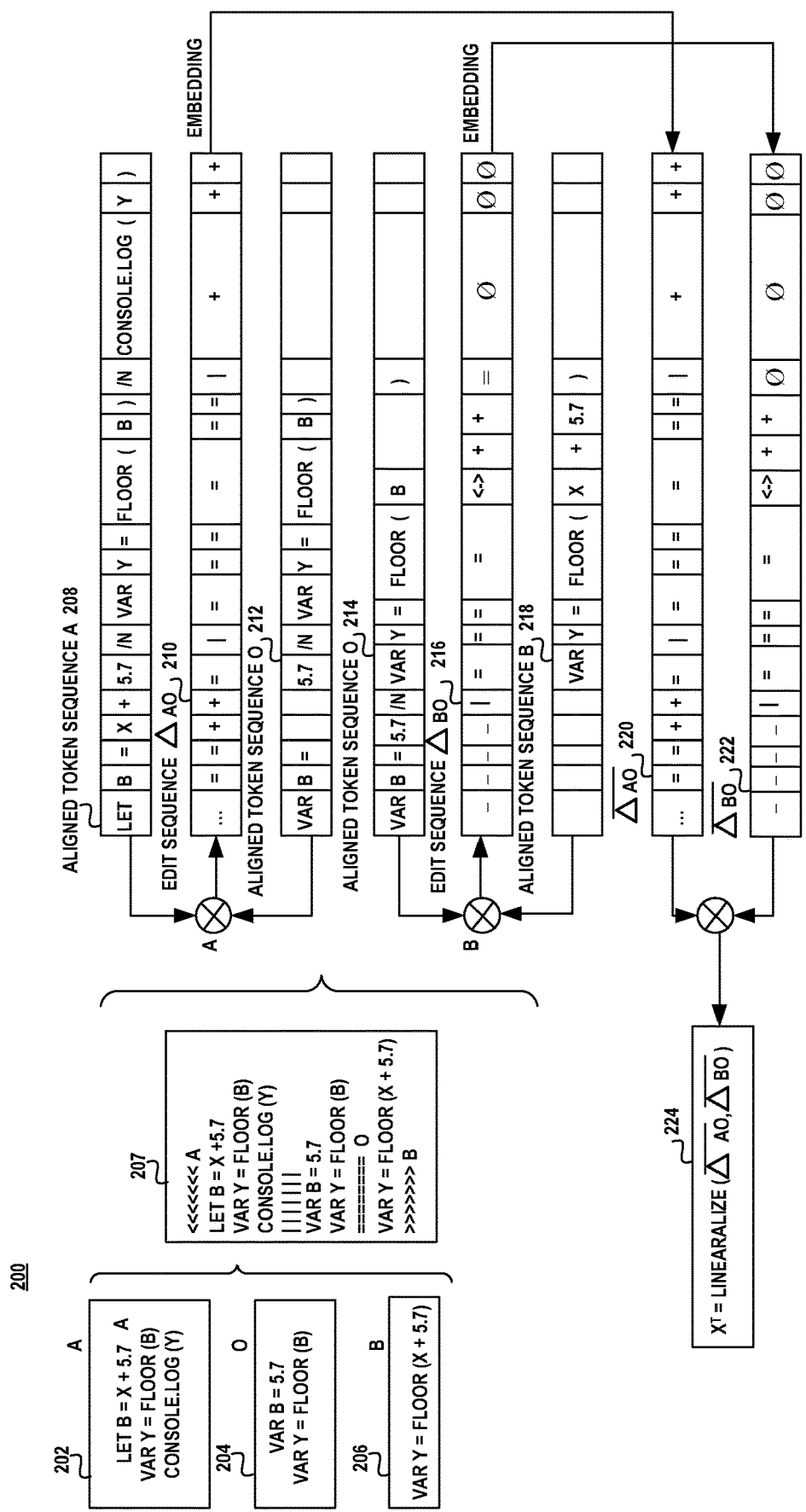
FIG. 2 is a schematic diagram illustrating the construction of an edit-aware input sequence from merge conflicts extracted from source code repositories.

FIG. 2 depicts an exemplary system 200 for generating an edit-aware input sequence representing the source code program involved in a three-way merge. Program O represents a code base 204 and programs A 202, B 206 represent two different programs having modifications made to code base O 204. The differences in program A and program B are represented in the diff3-formatted file 207 where the portions between the markers "<<<<<<<" and ">>>>>>>" indicate the differences. The merge conflict is shown between the markers "|||||||" and "=======".

The tokenizer 122 generates a token sequence for the code base O, the changed code A, and changed code B. The alignment component 124 performs a pair-wise alignment between each changed code token sequence and the code base token sequence. The pair-wise alignment aligns similar tokens in the code base sequence with the same tokens in a changed code token sequence. The pair-wise alignment between a pair of token sequences is used to generate an edit sequence. An edit sequence shows the operations needed to transform the code base O into the changed code sequence by using special characters to denote the operations. The special characters indicate the similarity between the tokens where "+" denotes an addition, "−" denotes a match, "⇆" denotes a replacement, "|" marks a new line, and "Ø" is a padding token used to fill out the length of a shorter sequence.

For example, aligned token sequence A 208 is compared with aligned token sequence O 212 to generate edit sequence ΔAO 210. Aligned token sequence B 218 is compared with aligned token sequence O 214 to generate edit sequence ΔBO 216.

The embedding encoder 126 then generates an embedding for each edit sequence, $\overline{\Delta AO}$ 220, $\overline{\Delta BO}$ 222. The two embeddings 220, 222 are then concatenated using a linearize function to produce matrix $X^T$ 224. The linearize function 128 linearly combines s embedded functions using learnable parameters $\theta \in \mathbb{R}^{S+1}$. The linearize function is defined as linearize $\theta$ $(x_1, \ldots x_s) = \theta_1 \cdot x_1 + \ldots + \theta_s \cdot x_s + \theta_{s+1}$, where all operations on the inputs $x_1, \ldots, x_s$ are pointwise linearize reducing the size of the embeddings by a factor of s.

Attention now turns to a discussion of the RNN encoder-decoder model.

RNN Encoder-Decoder Model

The RNN encoder-decoder model learns a merge algorithm by computing the conditional probability of generating a merge resolution R based on an edit-aware input sequence derived from the three input sequences A, B, O as:

$$p(R|A, B, O) = \prod_{j=1}^{N} p(R_j | R_{<j}, A, B, O),$$

which is the probability of generating the j-th element of the merge resolution given the elements generated so far.

Figure 3:
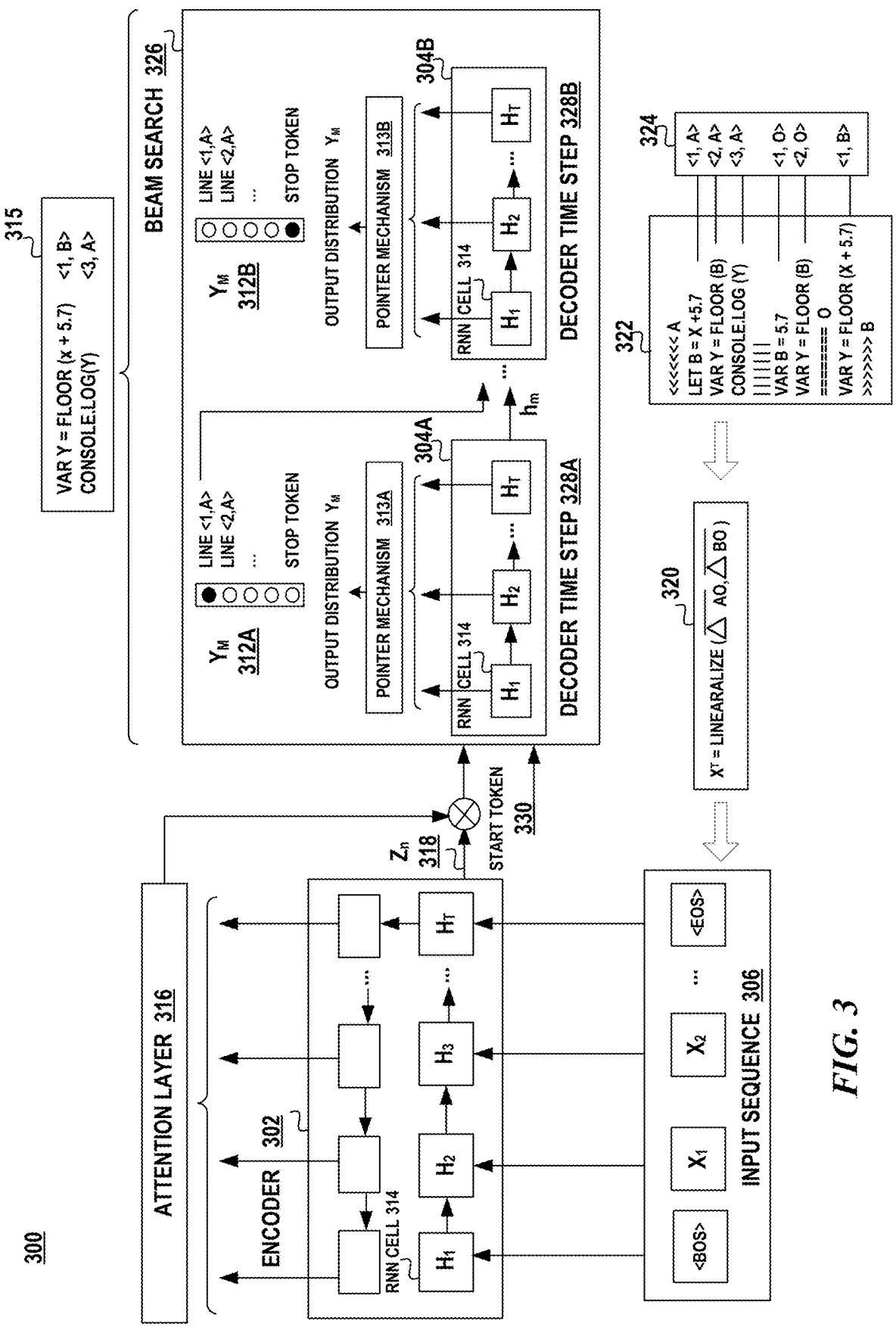
FIG. 3 is a schematic diagram illustrating an exemplary configuration of an RNN encoder-decoder model and its use for automatic merge resolution.

FIG. 3 represents an exemplary RNN encoder-decoder model 300. In one aspect, the model is based on an encoder 302 and decoder 304 architecture with an attention layer 316. The encoder 302 encodes a variable-length input sequence 306 into a fixed-length internal representation and passes the fixed-length internal representation 308 to attention layer 316. The attention layer 316 computes a weighted average which is passed to the decoder 304. The decoder 304 predicts one line of a candidate merge resolution at each time step from the encoder's internal representation 318 and the previous lines in a candidate merge resolution 312A-312B ("312").

The encoder 302 is a bidirectional RNN that includes a forward RNN and backward RNN having RNN cells 314. In one aspect, the RNN cells 314 are Gated Recurrent Units (GRU). The encoder 302 receives an input sequence 306 which is the matrix $X^T$ representing the linearized combined embeddings of the edit-aware input sequences 320 described in FIG. 2. This sequence 320 represents the four aligned token sequences and the two edit sequences derived from the edits made to program A, B, and O 322.

The forward RNN reads the input sequence 306 in order from $x_1$ to $x_T$ and calculates a sequence of hidden states $\vec{h}_1, \ldots, \vec{h}_T$. The backward RNN reads the input sequence 306 in the reverse order from $x_T$ to $x_1$ and calculates a sequence of backward states $\overleftarrow{h}_T, \ldots, \overleftarrow{h}_1$.

The encoder 302 outputs are input into an attention layer 316 that is separate from the encoder. Attention is a mechanism that identifies which parts of an input sequence are relevant to each symbol in the output sequence. The attention layer 316 takes an encoder output tensor $Z_n$ of shape B×max_input_sequence_len×(2*H), where B is the batch size, and H is the encoder hidden dimension and the factor of 2 because the encoder GRU is bidirectional, and performs matrix multiplication operation between the attention weight matrix A of shape B×1×max_input_sequence_len and the $Z_n$. The attention weight matrix A is obtained by applying a linear transformation with the projection matrix P having a number of rows (input dimensions) of 2*H, and the number columns (output dimensions) of max_input_sequence_len, to the concatenation of the embedding of the decoder input sequence and the decoder hidden states at a given decoding step. The softmax activation is applied along the temporal dimension of the tensor A in order to convert the result to normalized attention scores per each token. Finally, one more linear transformation from dimension 2H to H, followed by a ReLU (rectified linear unit) nonlinearity is applied to obtain the attention layer output, a tensor of shape B×H.

In this model, $((X_N)_{N \in N}$ represents the input sequence 306 and $(Y_M)_{M \in N}$ represents a candidate resolution sequence 315, where M is vocabulary size and N is the number of segments in a program. For each $X_n \in X_N$, an embedding extracts a column vector of size D from embedding matrix $E \in R^{D \times |V|}$ to produce the embedding vector $\overline{x_n}$=E·onehot $(x_n)$, where onehot maps a discrete token from an input vocabulary, V, into a respective one-hot column-vector representation, where E is an embedding matrix, transposed.

The encoder 302 processes each input sequence 306 to produce a hidden state $Z_n$ 310 after the n-th element of the input sequence, $Z_n$=encode $(Z_{n-1}, \overline{x_n})$ 318. The attention layer receives the encoded input sequence $Z_n$. The decoder 304 decodes the encoded token sequence from the attention layer and generates an output sequence $Y_M$ 312A, 312B ("312") which represents a probability distribution with respect to the line indices, that is, the probability of each line in the input sequence likely to be the next line in the output sequence.

The lines are represented by an integer that corresponds to each line of the edit-aware input sequence. The edit-aware input sequence includes the "/n" symbol which is used to identify the lines of a program. For example, let $L_A$ be the number of lines in program A and let $L_B$ be the number of lines in program B. Let L=1, 2, ..., ($L_A$+$L_B$). Then a value i ∈ L corresponds to the i-th line of A if i<=$L_A$ and the i-$L_A$-th line from B, otherwise. As shown in FIG. 3 in box 324, the first input line of program A is represented as <1,A>, the second input line of program A is represented as <2,A>, the third input line of program A is represented as <3,A>, the first line of program B is represented as <1,B>, the first line of program O is represented as <1,O>, and the second line of program O is represented as <2,O>. As shown in box 315, the candidate resolution sequence includes line <1,A> and line <3,A>.

The decoder 304 generates a sequence of hidden states $H_M$ and models the conditional probability of the lines copied from the input programs, A, B, O, by predicting a value in $y_m \in Y_M$: p $(y_m | y_1, \ldots, y_{m-1}, A, B, O)$=softmax $(h_m)$ where $h_m \in H_M$ is the decoder hidden state at the m-th element of the output sequence and the argmax $(y_m)$ yields an index into L.

The model architecture, training procedure, and vocabulary encoding procedures are hyperparameters that are tailored to meet a particular objective. The values of the hyperparameters influence how the parameters are learned (e.g., $h_m$).

In one aspect, the hyperparameters may include the following: (1) token and position embedding layers of dimensions: 30000×768, and 1024×768 respectively; (2) the configuration of the RNN encoder-decoder model with 2 encoder gated recurrent units (GRUs) and 2 decoder GRUs; (3) for the training procedure: supervised learning approach given three input programs (A, B, O) involved in a merge conflict with the target being the output lines of the merge resolution R, with a cross-entropy loss optimization objective; the sequence length of 1024 symbols; a mini-batch size of 8; the gradient accumulation steps for each weight update is 8; the Adam stochastic optimization procedure is used to train the feed forward neural network; and the learning rate is 0.0001; (4) the data normalization procedure: normalize all string and numerical literals, keeping the ten most frequent; and (5) the vocabulary encoding procedure: byte-level byte-pair encoding; and introduce special control flow tokens to denote start and stop symbols.

The inference phase utilizes a beam search to find the most likely candidate resolution sequences. A beam search iteratively generates lines by invoking the RNN encoder-decoder model. The output of the RNN encoder-decoder model is a matrix of line probabilities for each position in a candidate resolution sequence. The beam search concentrates on the k most probable lines at each iteration to get the best path to the most likely candidate resolution sequence. At each iteration, each of the k most probable lines are concatenated with the tokens in the preceding iterations to form a partial candidate resolution sequence.

A beam search uses a breadth-first search to build a search tree. The search tree is composed of nodes at one or more inference levels. Each node represents a probability distribution generated by the RNN encoder-decoder model for the lines in the model vocabulary. At each level, only the top k lines having the highest probabilities from the output distribution generated by the RNN encoder-decoder model are expanded to the next inference level. The variable k is preconfigured and also referred to as the beam width. Each of the k lines is then expanded into a search that updates the current context sequence with the selected line to input into the RNN encoder-decoder model to generate an additional probability distribution for the next line in a candidate resolution sequence. This process is repeated until the stop token is predicted as being the next likely candidate resolution sequence.

As shown in FIG. 3, at the initial iteration of the beam search 326, an input sequence is input into the encoder 302 and the internal representation of the encoder 318 is input into the decoder 304 along with a start token 330. The decoder 304A generates a probability distribution for the lines of the input sequences 312A and the lines having the highest probabilities are expanded in the next iteration. At each subsequent iteration 328B, the next input sequence is input into the encoder and the output of the encoder is input into the decoder along with the previous decoder output 312A. The beam search 326 ends when the decoder generates a probability distribution 312B where the stop token has the highest probability of being the next line in a candidate resolution sequence.

Figure 4:
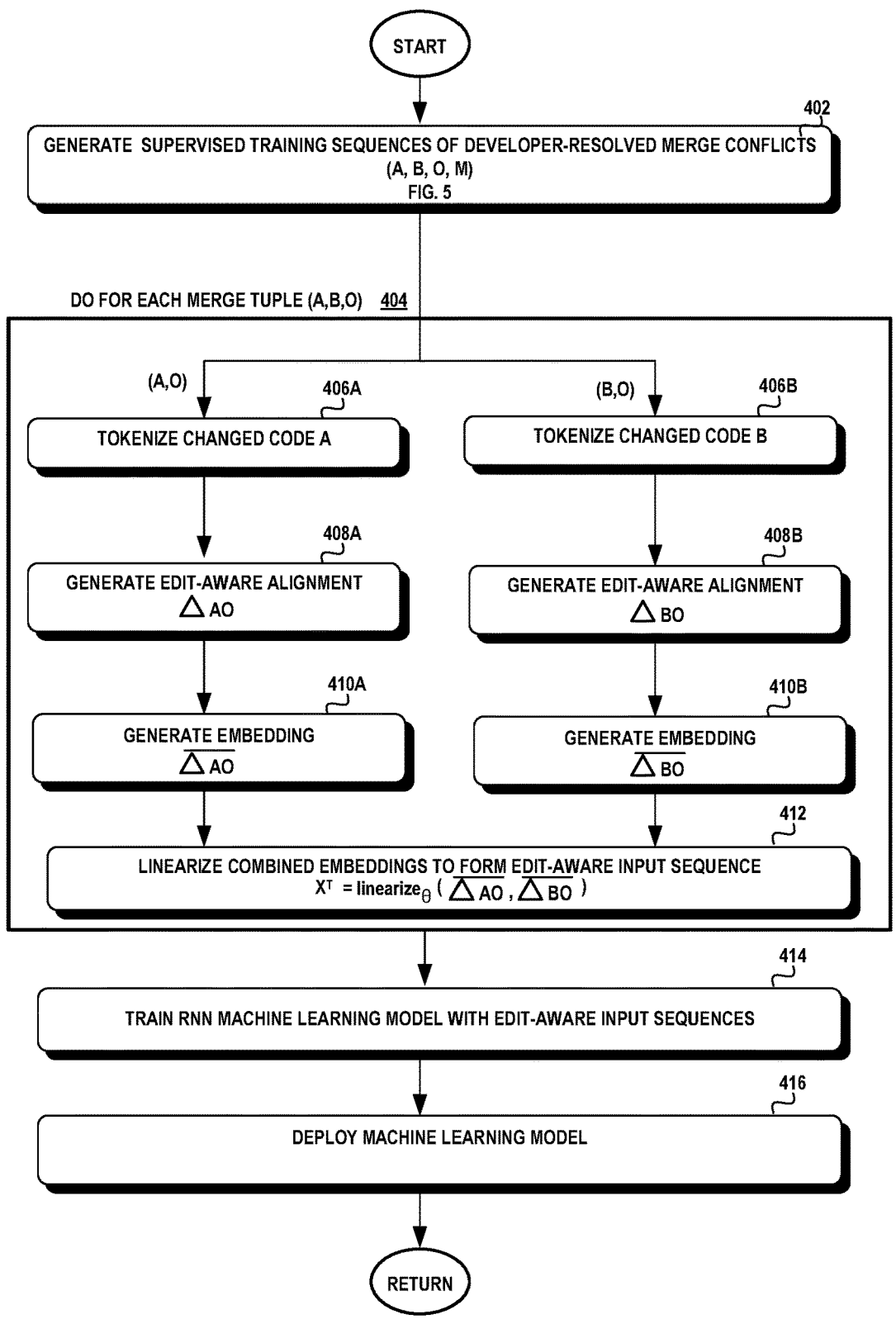
FIG. 4 is a flow diagram illustrating an exemplary method for generating the RNN encoder-decoder model.

Attention now turns to FIG. 4 which shows an exemplary method 400 for generating a machine learning model to predict merge resolutions.

The training dataset generation component 132 extracts high-quality merge conflict scenarios for the training dataset. The merge conflict scenarios come from developer-created merges and not from automated merges performed by a merge tool. (Collectively, block 402).

Figure 5B:
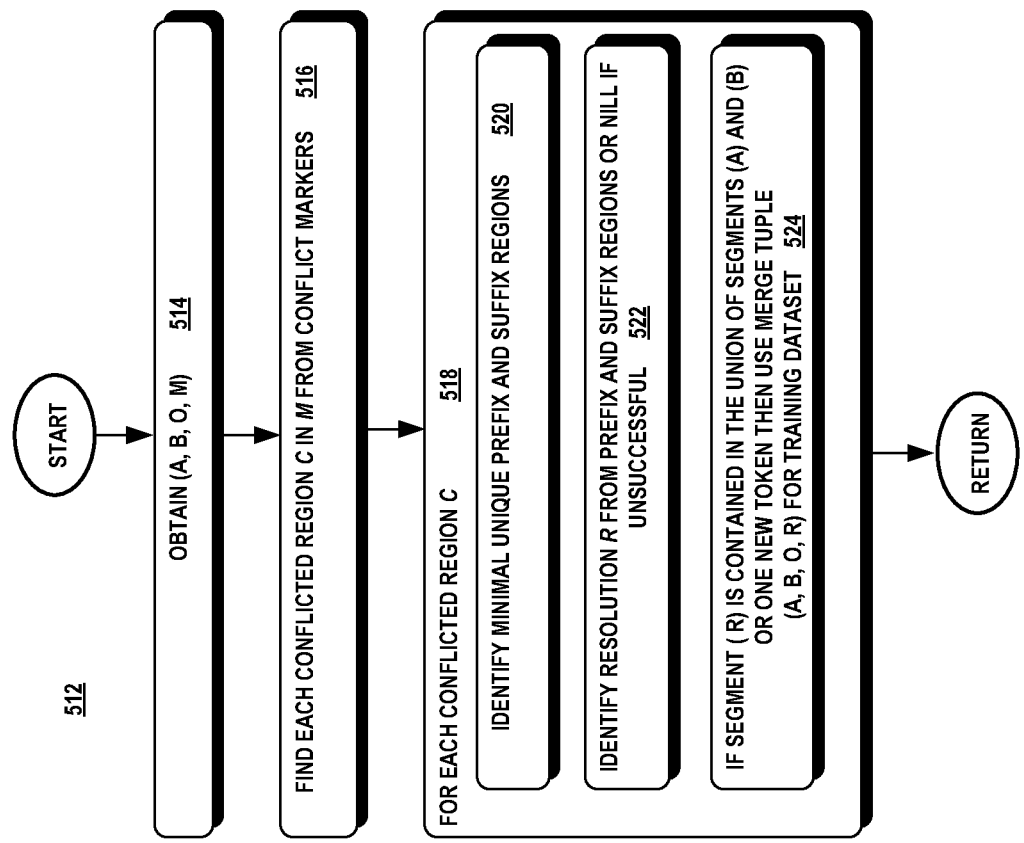
FIG. 5B is a flow diagram illustrating an exemplary method for obtaining merge conflict scenarios for a training dataset that trains the RNN encoder-decoder machine learning model.
Figure 5A:
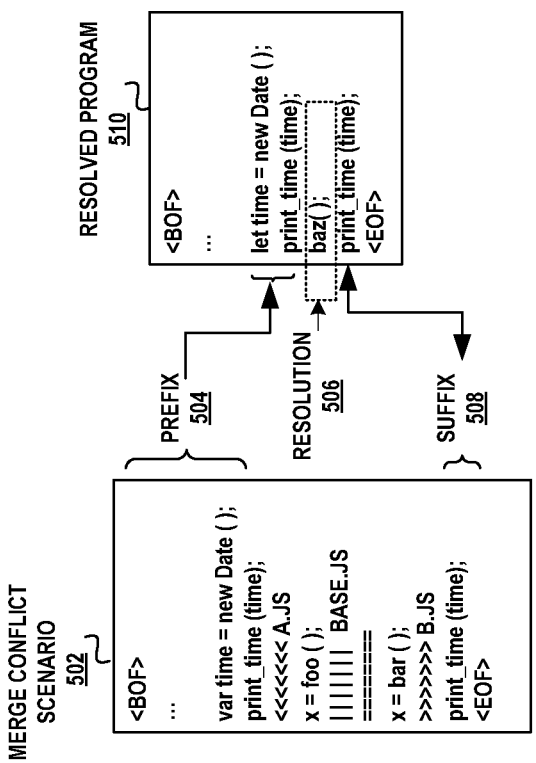
FIG. 5A is a schematic diagram illustrating an exemplary merge conflict scenario in a diff3 format.

Referring to FIGS. 5A and 5B, there is shown an exemplary method for extracting the merge conflict scenarios. FIG. 5A illustrates an exemplary merge instance (A, B, O, R) in a program M in the diff3 format. FIG. 5B illustrates an exemplary method for extracting merge instances from developer-created merge programs.

A program M may contain several regions where a merge is performed. The merge tuple (A, B, O, R) represents one instance of a merge in the merge program M. The example program 502 shown in FIG. 5A has one merge instance. However, it should be understood that this example is for illustration purposes only and should not to be construed as limiting the technique described herein.

Source code programs of a merge tuple (A, B, O, M) are obtained from a source code repository (block 514). In one aspect, the merges are from a git merge which is formatted in the diff3 format. FIG. 5A shows a merge scenario in the diff3 format 502 having conflict markers that separate the changes in program A.JS and program B.JS and the original code base, BASE.JS. Program 510 illustrates the resolved program or resolution R.

The merge conflict scenario 502 is scanned for the conflict markers which identify each conflicted region C in program M (block 516). For each conflicted region C (block 518), the minimal unique prefix and the minimal unique suffix of the conflicted region is identified (block 520).

The minimal unique prefix is the minimum portion of the merge conflict scenario that precedes the conflicted region and which appears uniquely in the resolved program 510. The minimal unique suffix is the minimum portion of the merge conflict scenario that follows the conflicted region and appears uniquely in the resolved program 510. As shown in FIG. 5A, the prefix 504 is the portion of program M that precedes the initial conflict markers, "<<<<<<<<" and the suffix 508 is the portion of program M that follows the closing conflict markers ">>>>>>>>". The minimal unique prefix is the string "print_time (time);" and the minimal unique suffix is the string "print_time (time)." (Collectively, block 520)

The resolution 506 is located between the minimal unique prefix and the minimal unique suffix. In FIG. 5B, the resolution 506 is the program statement "baz ( );" (Collectively, block 522).

A merge tuple (A, B, O, R) is selected for use in the training dataset as a positive merge tuple if the source code segment of the resolution R is found within the union of the program segments of A and B. If a merge tuple introduces a single new token not found in program segments A and B, then the merge tuple (A, B, O, ⊥) is used in the training dataset as a conflicting merge tuple. The symbol ⊥ represents a merge conflict. In the merge scenario shown in FIG. 5A, the resolution baz ( ) is not from program segments A and B but only introduces a single new token, baz, and as such, resolution 510 is used as a conflicting merge tuple included in the training dataset. The decision to ignore merges that introduce new lines in a resolution but not new tokens is motivated by the observation that up to 87% of merges consist purely of lines from the input edits. (Collectively, block 524).

Turning back to FIG. 4, each merge tuple (A, B, O), is then analyzed to generate a corresponding edit-aware input sequence as discussed above with respect to FIG. 2. The processing of a merge tuple into an edit-aware input sequence may be performed in parallel as shown in FIG. 4. However, it should be understood that the method is limited to this process flow and may be processed otherwise.

The Merge2Matrix component 106 receives each merge tuple (A, B, O) in the training dataset and processes each merge tuple to form an edit-aware input sequence (block 404). The parser 121 generates a parse tree for the code base O, the changed code A, and changed code B respectively.

The tokenizer 122 generates a token sequence for the changed code A (block 406A) and a token sequence for changed code B (block 406B).

The alignment component 124 performs a pair-wise alignment between each changed code token sequence and the code base token sequence thereby generating an edit-aware alignment between changed code A and code base O, $\Delta AO$ (block 408A) and an edit-aware alignment between changed code B and code base O, $\Delta BO$ (block 408B). The embedding encoder 126 generates an embedding for the edit-aware alignment between changed code A and code base O, $\overline{\Delta AO}$ (block 410A), and an embedding for edit-aware alignment between changed code B and code base O, $\overline{\Delta BO}$ (block 410B). The embeddings are concatenated and then linearized to form the edit-aware input sequence, matrix, $X^T = \text{linearize}_\theta (\overline{\Delta AO}, \overline{\Delta BO})$ (block 412).

Each matrix of the training dataset, $X^T$, is then applied to the RNN encoder-decoder model to teach the model to learn to translate an edit-aware input sequence representing the merge tuple (A, B, O) into a resolution that merges the changes of programs A, B into code base O or indicates a merge conflict (block 414).

The RNN encoder-decoder model is trained iteratively, making multiple passes over the training dataset before converging to a minimum. An epoch represents the entire training dataset passed forwards through the encoder and decoder once. Since the training dataset is very large, it is partitioned into smaller batches. The training is iterative and the entire dataset is passed through the model in multiple iterations. Each training iteration includes forward propagation, loss calculation, backpropagation steps followed by updating the weights. (Collectively, block 414)

Figure 6:
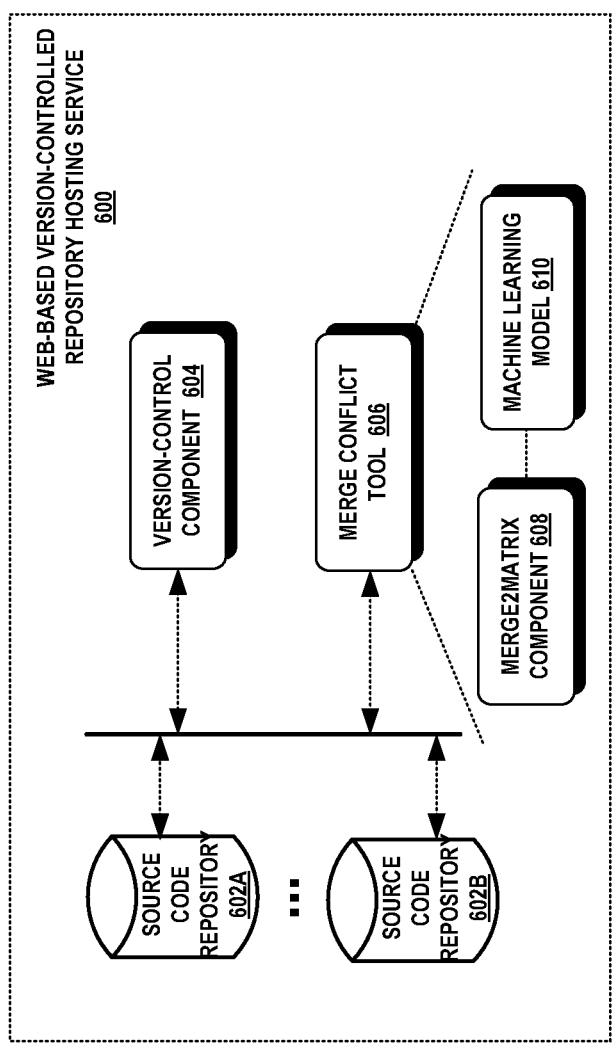
FIG. 6 is a block diagram illustrating an exemplary web-based version-controlled repository hosting service hosting service utilizing an automated merge conflict resolution system.

Upon validation of the model, the model is then deployed (block 416). In one aspect, the model is deployed as part of a web-based version-control hosting service. Turning to FIG. 6, there is shown an exemplary web-based version-control hosting service 600. The service 600 is a file archive and web hosting service for source code, documentation, and other related data stored in source code repositories 602A, 602B ("602"). The source code repositories may be publicly-accessible or private. The service 600 includes a version-control component 604 that tracks changes made to the files in a source code repository over time.

The service 600 includes a merge conflict tool 606 that automatically generates proposed merge resolutions upon detection of a program merge. The merge conflict tool 606 includes the Merge2Matrix component 608 and a machine learning model 610, such as the RNN encoder-decoder model described herein. The merge conflict tool 606 monitors the merge operations performed at a source code repository and automatically generates a candidate merge resolution to present to the developer or indicate a merge conflict. The merge conflict tool 606 uses the Merge2Matrix component 608 and the machine learning model 610 to predict a candidate merge resolution.

Figure 7:
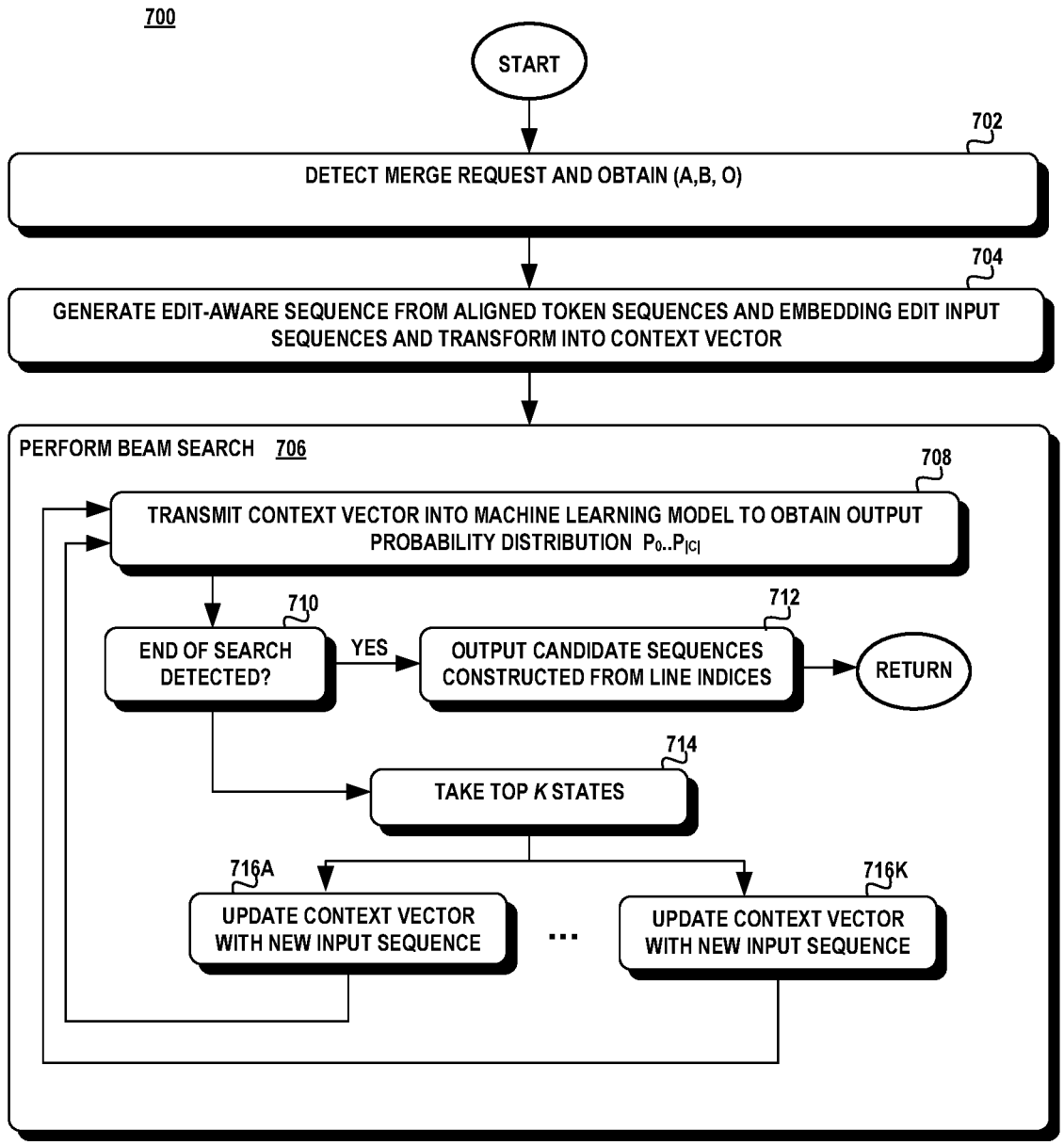
FIG. 7 is a flow diagram illustrating an exemplary inference method for translating a merge request into a merge resolution.

Turning to FIGS. 6 and 7, there is shown an exemplary method 700 depicting use of the machine learning model to infer a merge resolution. A request to perform a three-way merge is detected (block 702). In one aspect, the service 600 may be GitHub which recognizes Git commands The merge conflict tool 606 may recognize a git merge command which finds a common base to combine changes from several branches. The merge conflict tool 606 obtains the changed programs A, B and the common base O (block 704). The Merge2Matrix component generates aligned token sequences and edit input sequences from the merge tuple (A, B, O) which are transformed into an edit-aware input sequence as described above (block 704).

The merge conflict tool 606 performs a beam search to generate one or more candidate merge resolutions (block 706). The beam search uses a context vector containing the edit-aware input sequence to initiate a search. At each iteration of the search, the machine learning model is invoked with the context vector to generate a probability distribution, $P_0 \ldots P_{|C|}$, where C is the number of lines of source code represented in the edit-aware input sequence (block 708).

If the probability distribution indicates that a stop token is the most likely token to follow in a partial candidate merge resolution (block 710-yes), then the top k candidate merge resolutions are constructed from the line indices (block 712). Otherwise, the beam search takes the top k states or lines identified from the probability distribution generated by the model (block 714) and generates a new context vector for each of the k states (block 716A, 716K). The new context vectors are then applied separately through a distinct execution path to the machine learning model and a respective output distribution is generated (blocks 708). The beam search 706 ends when the stop token is selected as the most likely candidate to complete a partial candidate sequence (block 712).

Exemplary Operating Environment

Figure 8:
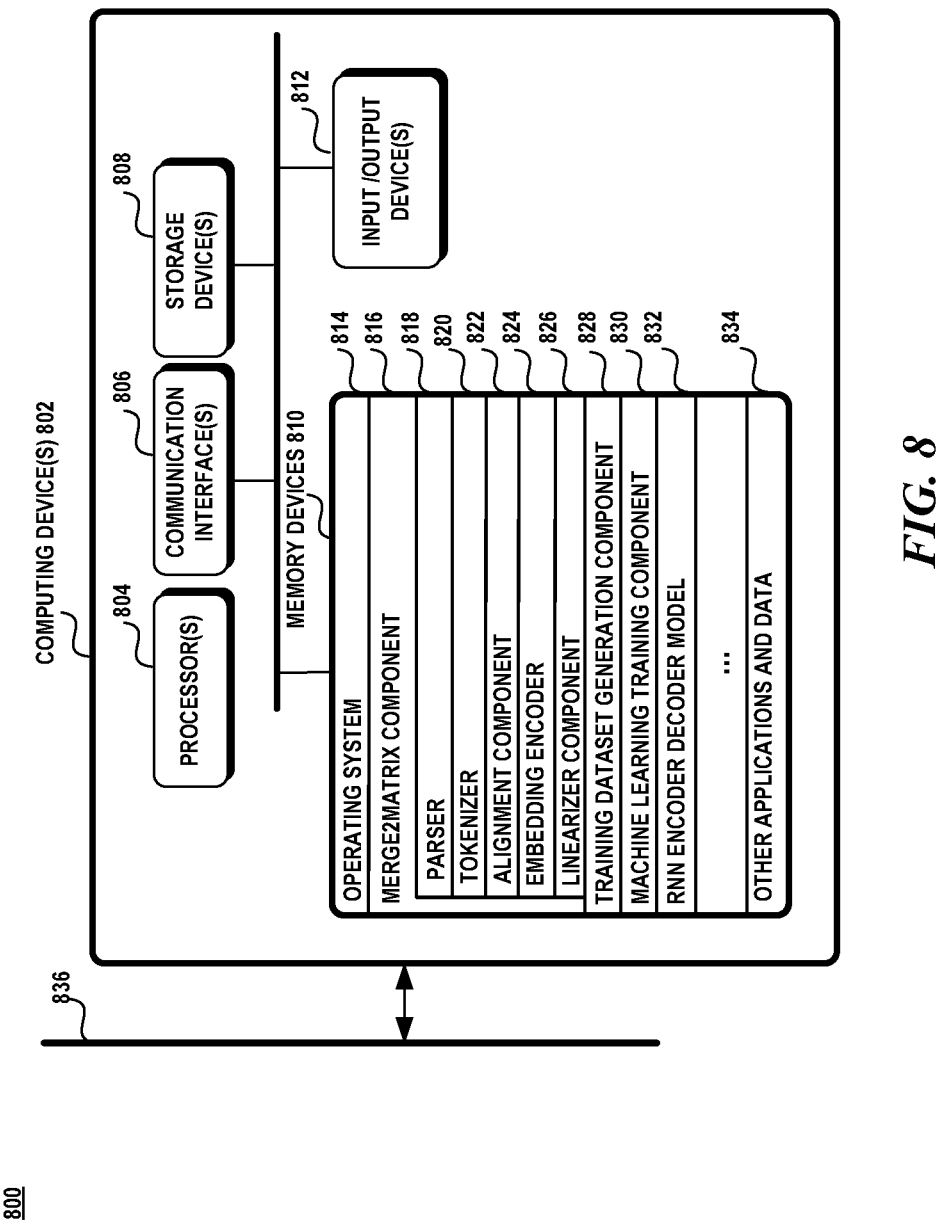
FIG. 8 is a block diagram illustrating an exemplary operating environment.

Attention now turns to a discussion of an exemplary operating environment. FIG. 8 illustrates an exemplary operating environment 800 in which one or more computing devices 802 are used to train the machine learning model and use the machine learning model for automated merge conflict resolution. However, it should be noted that the aspects disclosed herein is not constrained to any particular configuration of devices. Computing devices 802 may be configured as a cloud service that generates the machine learning model as a service for merge resolution systems or part of web-hosting version-control repository hosting system. Alternatively, a computing device 802 may part of a private repository. It should be noted that the operating environment is not limited to any particular configuration and other configurations are possible.

A computing device 802 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 800 may be configured in a network environment, a distributed environment, a multi-processor environment, or a stand-alone computing device having access to remote or local storage devices.

The computing device 802 may include one or more processors 804, one or more communication interfaces 806, one or more storage devices 808, one or more input/output devices 812, and one or more memory devices 810. A processor 804 may be any commercially available or customized processor and may include dual microprocessors and multi-processor architectures. A communication interface 806 facilitates wired or wireless communications between the computing device 802 and other devices. A storage device 808 may be computer-readable medium that does not contain propagating signals, such as modulated data signals transmitted through a carrier wave. Examples of a storage device 808 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 808 in the computing device 802. The input/output devices 812 may include a keyboard, mouse, pen, voice input device, touch input device, display, speakers, printers, etc., and any combination thereof.

A memory device 810 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 810 may also include one or more external storage devices or remotely located storage devices that do not pertain to propagated signals, such as modulated data signals transmitted through a carrier wave.

The memory device 810 may contain instructions, components, and data. A component is a software program that performs a specific function and is otherwise known as a module, program, component, and/or application. The memory device 810 may include an operating system 814, a Merge2Matrix component 816 including a parser 818, a tokenizer 820, an alignment component 822, an embedding encoder 824, and a linearizer component 826, a training dataset generation component 828, a machine learning training component 830, a RNN encoder decoder model 832, and other applications and data 834.

The computing devices 802 may be communicatively coupled via a network 836. The network 836 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 836 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

A system is disclosed having one or more processors; and a memory that stores one or more programs that are configured to be executed by the one or more processors. The one or more programs including instructions to perform acts that: obtain an input sequence including a representation of a merge tuple (A, B, O), wherein A is a program having source code changes to a common code base O, wherein B is a program having source code changes to the common code base O, wherein the input sequence includes edits in program A over common code base O and edits in program B over common code base O; and translate the input sequence into an output sequence using a sequence-to-sequence machine learning model, wherein the output sequence includes a program R that represents a merge resolution, the merge resolution including one or more lines of source code in program A, one or more lines of source code in program B, and/or one or more lines of source code in code base O.

In one aspect, the output sequence indicates a merge conflict, the input sequence is of variable-length and the output sequence is of variable-length, the input sequence is derived from a first edit sequence representing textual differences between program A and the common code base O, and a second edit sequence representing textual differences between program B and the common code base O, the first edit sequence is derived from an aligned token sequence of program A relative to an aligned token sequence of the common code base O and the second edit sequence is derived from an aligned token sequence of program B relative to an aligned token sequence of the common code base O, the input sequence is a linearized concatenation of an embedding of the first edit sequence and an embedding of the second edit sequence and the machine learning model is a RNN encoder-decoder model.

A computer-implemented method is disclosed, comprising: detecting a program merge of program A and program B into code base O, wherein program A includes modifications made to code base O, program B includes modifications made to code base O, wherein program A, program B, and code base O differ; generating an edit-aware input sequence representing similarities and/or differences between a tokenized representation of program A relative to a tokenized representation of code base O and a tokenized representation of program B relative to a tokenized representation of code base O; and processing the edit-aware input sequence using a sequence-to-sequence machine learning model that translates the edit-aware input sequence into an output sequence, the output sequence representing a merge resolution that includes lines of program A, lines of program B, and/or lines of code base O without a merge conflict.

In one or more aspects, the output sequence indicates a merge conflict. In one or more aspects, the method further comprises: aligning the tokenized representation of program A relative to the tokenized representation of code base O to determine the similarities and/or differences between program A and code base O; and aligning the tokenized representation of program B relative to the tokenized representation of code base O to determine the similarities and/or differences between program B and code base O.

In one or more aspects, the method further comprises translating the edit-aware input sequence into a sequence of pointers, a pointer representing a line of program A, line of program B, or line of code base O; and generating the output sequence from lines corresponding to the sequence of pointers.

In one or more aspects, the method further comprises: encoding, by an encoder of the sequence-to-sequence machine learning model, each input in the edit-aware input sequence into a respective encoder hidden state; and generating, by a decoder of the sequence-to-sequence machine learning model, a conditional probability of a target sequence based on the encoder hidden states, the target sequence including target indices, the probability of a target index predicted based on the recurrent state of the decoder, the previous indices in the target sequence, and an attention vector.

In one or more aspects, the attention vector is a weighted average of the encoder hidden states, the sequence-to-sequence machine learning model is a Recurrent Neural Network (RNN) encoder-decoder, and the sequence-to-sequence machine learning model is trained on developer-resolved merge resolutions.

A device is disclosed comprising: at least one processor and a memory; wherein the at least one processor is configured to execute instructions stored in the memory that perform acts that: form a training dataset of edit-aware input sequences from a plurality of developer-generated merge programs, an edit-aware input sequence representing a merge tuple (A, B, O), wherein a developer-generated merge program resolves a merge conflict between program A, program B, and code base O, wherein program A contains modifications to code base O, program B includes modifications to code base O; and train a sequence-to-sequence machine learning model with the training dataset of edit-aware input sequences to learn to translate a target edit-aware input sequence into a merge resolution without a merge conflict, wherein the merge resolution is an interleaving of lines of source code from program A, program B, and/or code base O.

In one or more aspects, the at least one processor is configured to execute further instructions stored in the memory that perform acts that: obtain a first developer-resolved program from the plurality of developer-resolved programs; obtain a merge conflict file including a conflicted region R in the first developer-resolved program; find a minimal unique prefix of the conflicted region R that matches a code segment in the first developer-resolved program; find a minimal unique suffix of the conflicted region R that matches a code segment in the first developer-resolved program; and identify the merge resolution as code segment between the minimal unique prefix and the minimal unique suffix.

In one or more aspects, the at least one processor is configured to execute instructions stored in the memory that perform acts that: include the merge resolution in the training dataset when the merge resolution includes lines of source code from program A, program B and/or code base O. In one or more aspects, the at least one processor is configured to execute instructions stored in the memory that perform acts that: include the merge resolution in the training dataset when the merge resolution does not include lines of source code from program A, program B or code base O and includes a single new token in the merge resolution not found in program A, program B, or code base O. In one or more aspects, the sequence-to-sequence machine learning model includes an RNN encoder-decoder model.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:

1. A system, comprising:
one or more processors; and
a memory that stores one or more programs that are configured to be executed by the one or more processors, the one or more programs including instructions to perform acts that:
obtain an input sequence including a representation of a merge tuple (A, B, O), wherein A is a program having source code changes to a common code base O, wherein B is a program having source code changes to the common code base O, wherein the input sequence includes edits in program A over common code base O and edits in program B over common code base O, wherein the edits in program A over the common code base O comprise a token-aligned sequence comprising operations to transform tokens in the common code base O with the source code changes in program A, wherein the edits in program B over common code base O comprise a token-aligned sequence comprising operations to transform tokens in the common code base O with source code changes in program B, wherein a line of source code in program A, program B and common code base O comprises a plurality of tokens, wherein a token comprises a sequence of characters in a respective line of source code;
generate, from a sequence-to-sequence machine learning model, given the input sequence, a probability distribution with respect to indices to lines of source code from the program A, the program B, or the common code base O at each of a plurality of timesteps; and
construct a program R from the probability distribution generated by the sequence-to-sequence machine learning model at each of the plurality of time steps, wherein the program R resolves a three-way merge of the merge tuple (A,B,O), wherein the program R comprises an ordered sequence of indices to lines of source code from the program A, the program B, or the common code base O, wherein a specific index to a corresponding line of source code in the program R is selected based on an associated probability generated by the sequence-to-sequence machine learning model for the corresponding line of source code to be a nextline of source code in the program R.

2. The system of claim 1, wherein the program R comprises a merge conflict.

3. The system of claim 1, wherein the input sequence is of variable-length and the output sequence is of variable-length.

4. The system of claim 1, wherein the input sequence is derived from a first edit sequence representing textual differences between the program A and the common code base O, and a second edit sequence representing textual differences between the program B and the common code base O.

5. The system of claim 4, wherein the first edit sequence is derived from an aligned token sequence of the program A relative to an aligned token sequence of the common code base O and the second edit sequence is derived from an aligned token sequence of the program B relative to an aligned token sequence of the common code base O.

6. The system of claim 5, wherein the input sequence is a linearized concatenation of an embedding of the first edit sequence and an embedding of the second edit sequence.

7. The system of claim 1, wherein the trained sequence-to-sequence machine learning model is a RNN encoder-decoder model.

8. A computer-implemented method, comprising:
detecting a program merge of program A and program B into code base O, wherein the program A includes modifications made to the code base O, wherein the program B includes modifications made to the code base O, wherein the program A, the program B, and the code base O differ;
generating an input sequence including a representation of a merge tuple (A, B, O), wherein A is a program having source code changes to a common code base O, wherein B is a program having source code changes to the common code base O, wherein the input sequence includes edits in program A over common code base O and edits in program B over common code base O, wherein the edits in program A over the common code base O comprise a token-aligned sequence comprising operations to transform the common code base O with source code changes in program A, wherein the edits in program B over common code base O comprise a token-aligned sequence comprising operations to transform tokens in the common code base O with source code changes in program B, wherein a line of source code in program A, program B and common code base O comprises a plurality of tokens, wherein a token comprises a sequence of characters in a respective line of source code;
generating, from a sequence-to-sequence machine learning model, given the input sequence, a probability distribution with respect to indices to lines of source code from the program A, the program B, or the common code base O at each of a plurality of timesteps; and
constructing a program R from the probability distribution generated by the sequence-to-sequence machine learning model at each of the plurality of time steps, wherein the program R resolves a three-way merge of the merge tuple (A,B,O), wherein the program R comprises an ordered sequence of indices to lines of source code from the program A, the program B, or the common code base O, wherein a specific line of source code in the program R is selected based on an associated probability generated by the sequence-to-sequence machine learning model for the specific line to be a next line in the program R.

9. The method of claim 8, wherein the program R indicates a merge conflict.

10. The method of claim 8, further comprising:
aligning the tokenized representation of the program A relative to the tokenized representation of the code base O to determine the similarities and/or differences between the program A and the code base O; and
aligning the tokenized representation of the program B relative to the tokenized representation of the code base O to determine the similarities and/or differences between the program B and the code base O.

11. The method of claim 8, further comprising:
wherein the sequence-to-sequence machine learning model comprises a neural-based decoder.

12. The method of claim 8, further comprising:
encoding, by an encoder of the sequence-to-sequence machine learning model, each input in the edit-aware input sequence into a respective encoder hidden state; and
generating, by a decoder of the sequence-to-sequence machine learning model, a conditional probability of a target sequence based on the encoder hidden states, the target sequence including target indices, the probability of a target index predicted based on the recurrent state of the decoder, the previous indices in the target sequence, and an attention vector.

13. The method of claim 12, wherein the attention vector is a weighted average of the encoder hidden states.

14. The method of claim 8, wherein the sequence-to-sequence machine learning model is a Recurrent Neural Network (RNN) encoder-decoder.

15. The method of claim 8, wherein the sequence-to-sequence machine learning model is trained on developer-resolved merge resolutions.

16. A device comprising:
at least one processor and a memory;
wherein the at least one processor is configured to execute instructions stored in the memory that perform acts that:
collect a plurality of developer-generated merge programs, wherein a developer-generated merge program resolves a merge conflict between program A, program B, and code base O, wherein the program A contains modifications to the code base O, wherein the program B includes modifications to the code base O;
transform each developer-generated merge program into an edit-aware input sequence, wherein the edit-aware input sequence represents an embedding of a merge tuple (A,B,O) formed from token sequences representing pairwise alignment of the tokens of the program A and the program B with the code base O and edit sequences edits between the pairwise alignment of the tokens of the program A and the program B with respect to the code base O, wherein an edit comprises an operation to transform the code base O with source code changes in program A or program B, wherein a line of source code in program A, program B and code base O comprise a plurality of tokens, wherein a token comprises a sequence of characters in a respective line of source code;
form a training dataset of the edit-aware input sequences; and
train a sequence-to-sequence machine learning model with the training dataset of edit-aware input sequences to learn to translate a target edit-aware input sequence into a merge resolution without a merge conflict by at least generating a probability distribution with respect to indices of lines of source code from program A, the program B, or the code base O at each of a plurality of timesteps and constructing a program R from the probability distribution generated by the sequence-to-sequence machine learning model at each of the plurality of time steps, wherein the program R resolves a three-way merge of the merge tuple (A,B,O), wherein the program R comprises an ordered sequence of indices to lines of source code from the program A, the program B, or the code base O, wherein a specific index to a corresponding line of source code in the program R is selected based on an associated probability generated by the sequence-to-sequence machine learning model for the corresponding line of source code to be a next line of source code in the program R.

17. The device of claim 16, wherein the at least one processor is configured to execute further instructions stored in the memory that perform acts that:
  obtain a first developer-resolved program from the plurality of developer-resolved merge programs;
  obtain a merge conflict file including a conflicted region R in the first developer-resolved merge program;
  find a minimal unique prefix of the conflicted region R that matches a code segment in the first developer-resolved merge program;
  find a minimal unique suffix of the conflicted region R that matches a code segment in the first developer-resolved merge program; and
  identify the merge resolution as code segment between the minimal unique prefix and the minimal unique suffix.

18. The device of claim 17, wherein the at least one processor is configured to execute instructions stored in the memory that perform acts that:
  include the merge resolution in the training dataset when the merge resolution includes lines of source code from program A, program B and/or code base O.

19. The device of claim 18, wherein the at least one processor is configured to execute instructions stored in the memory that perform acts that:
  include the merge resolution in the training dataset when the merge resolution does not include lines of source code from the program A, the program B or the code base O and includes a single new token in the merge resolution not found in the program A, the program B, or the code base O.

20. The device of claim 16, wherein the sequence-to-sequence machine learning model comprises an RNN encoder-decoder model.

* * * * *